Figure 3:
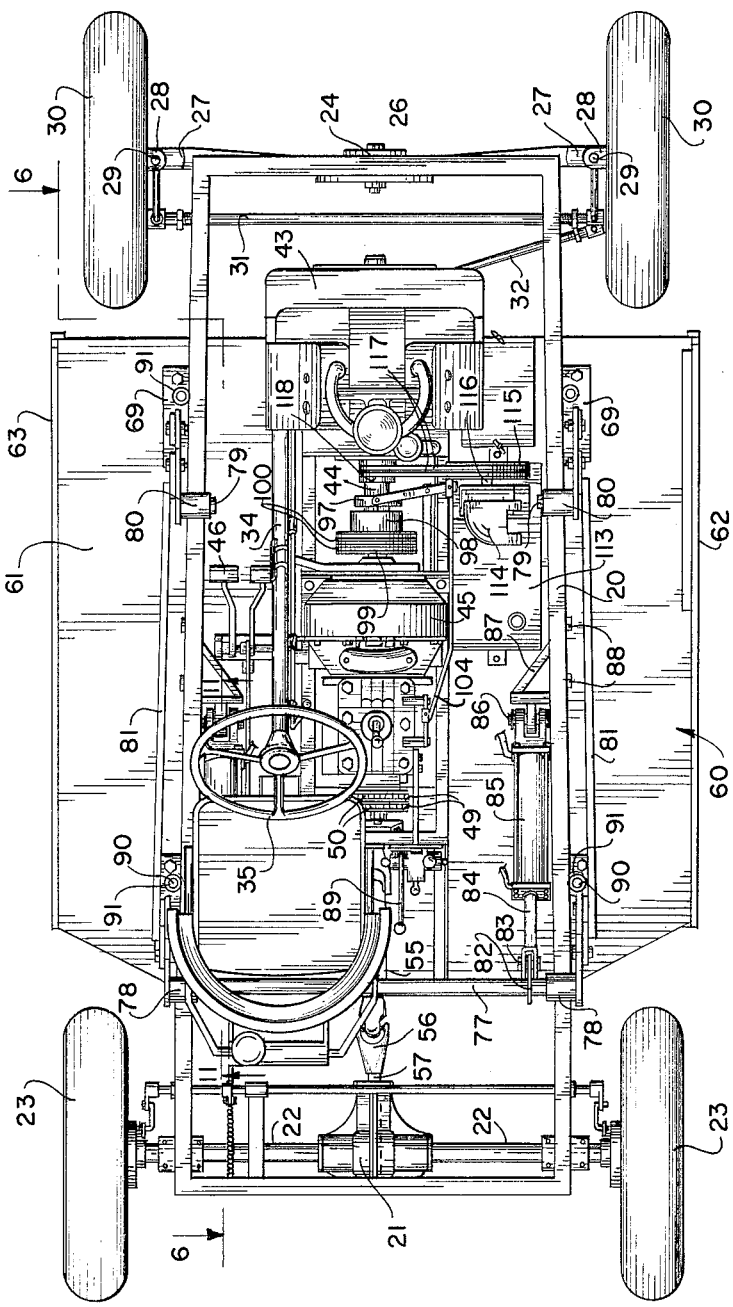

Sept. 14, 1965 D. H. SMITH 3,205,642
VERTICALLY ADJUSTABLE MOTOR AND ROTARY DISK CUTTER
Filed Dec. 17, 1962 6 Sheets-Sheet 1
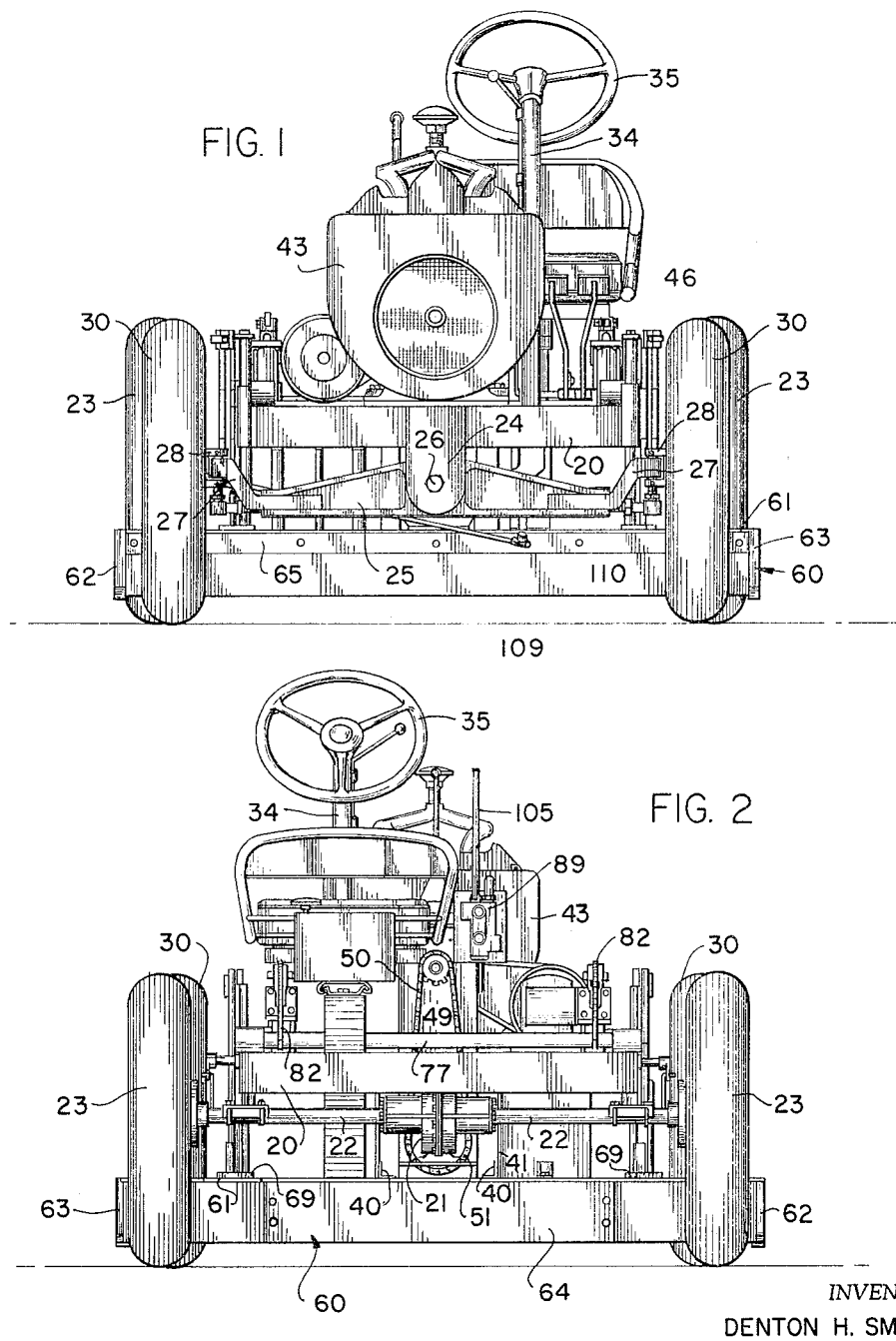
INVENTOR
DENTON H. SMITH
BY
ATTORNEYS Sept. 14, 1965            D. H. SMITH            3,205,642

VERTICALLY ADJUSTABLE MOTOR AND ROTARY DISK CUTTER

Filed Dec. 17, 1962            6 Sheets-Sheet 2

INVENTOR
DENTON H. SMITH

BY
ATTORNEY

Sept. 14, 1965 D. H. SMITH 3,205,642
VERTICALLY ADJUSTABLE MOTOR AND ROTARY DISK CUTTER
Filed Dec. 17, 1962 6 Sheets-Sheet 4

INVENTOR
DENTON H. SMITH

BY
ATTORNEY

Sept. 14, 1965    D. H. SMITH    3,205,642
VERTICALLY ADJUSTABLE MOTOR AND ROTARY DISK CUTTER
Filed Dec. 17, 1962    6 Sheets-Sheet 5

INVENTOR
DENTON H. SMITH
BY
ATTORNEY

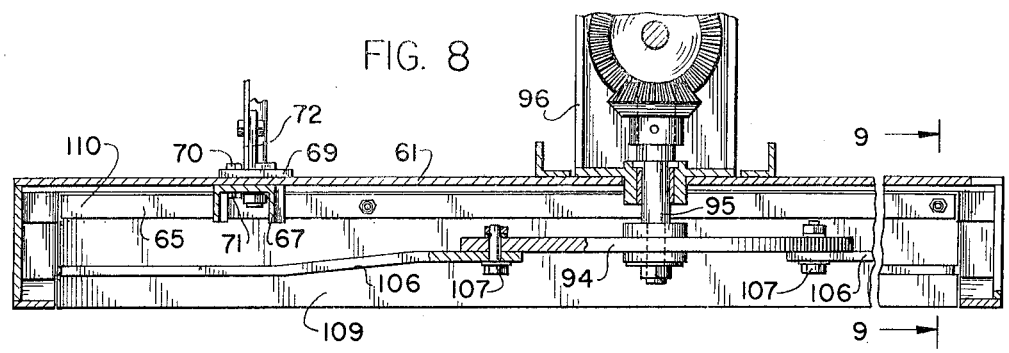
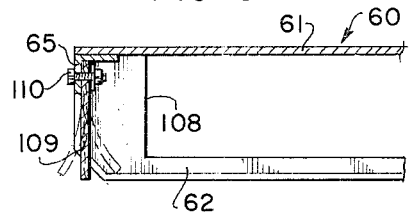
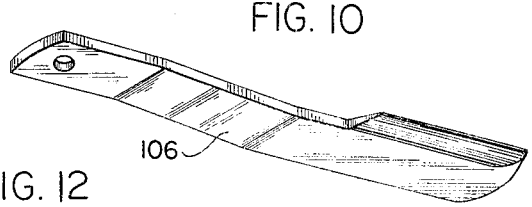
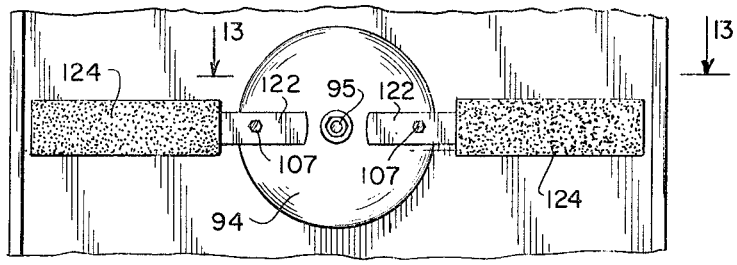
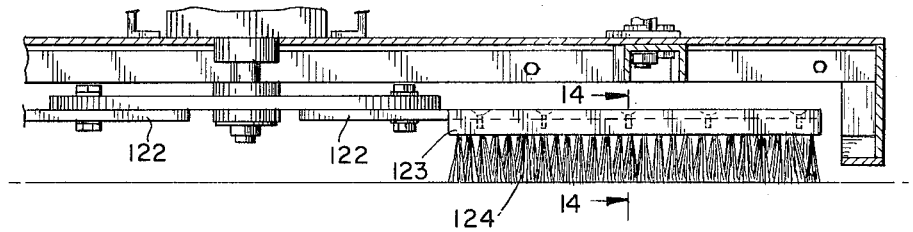
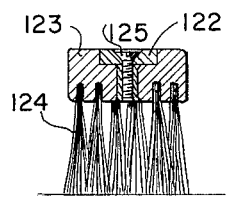

United States Patent Office 3,205,642
Patented Sept. 14, 1965

3,205,642
VERTICALLY ADJUSTABLE MOTOR AND
ROTARY DISK CUTTER
Denton H. Smith, P.O. Box 948, Commercial Street
Station, Springfield, Mo.
Filed Dec. 17, 1962, Ser. No. 245,081
3 Claims. (Cl. 56—25.4)

This invention relates to the care and maintenance of vegetation and to equipment utilized in maintaining such vegetation at a desired height.

The invention relates particularly to equpiment which may be utilized in the cutting of grass or the like during the growing season and for the removal of snow in the colder season and with such equipment having safety features for the protection of the user.

Heretofore grass-cutting machines of various kinds have been produced some of which have been mounted on self-propelled vehicles and others have been attached to the vehicles. The cutting elements of these machines have been driven either by the rotation of the wheels or from the power takeoff of the vehicle. The vehicle whic constitutes a majority of the weight has been relatively high to afford a clearance to permit the vehicle to pass over obstructions such as rocks, stumps, etc. Due to this road clearance the center of gravity of the vehicle has been relatively high and the angle of a slope or the like which it could traverse has necessarily been relatively small to prevent the vehicle from turning over due to the high center of gravity.

It is an object of the invention to provide a self-propelled vehicle having a relatively wide track and a grass-cutting device and with the center of gravity of the vehicle capable of being raised and lowered so that a relatively steep slope may be traversed and the growth thereon cut at any desired elevation.

Another object of the invention is to provide a self-propelled vehicle having a main frame on which the ground engaging wheels are mounted and an auxiliary frame adjustably mounted on the main frame and adapted to support the heavier portions of the vehicle, such as the motor, transmission, driver, etc., and such auxiliary frame capable of being moved vertically relative to the main frame.

A further object of the invention is to provide a self-propelled vehicle having a main frame and an auxiliary frame with the major portion of the weight of the vehicle being supported by the auxiliary frame and with the auxiliary frame being adjustable relative to the main frame by means of fluid operated mechanism.

A still further object of the invention is to provide a self-propelled vehicle which is adaptable for cutting vegetation during the warm season of the year and for removing snow during the colder season of the year.

Figure 4:
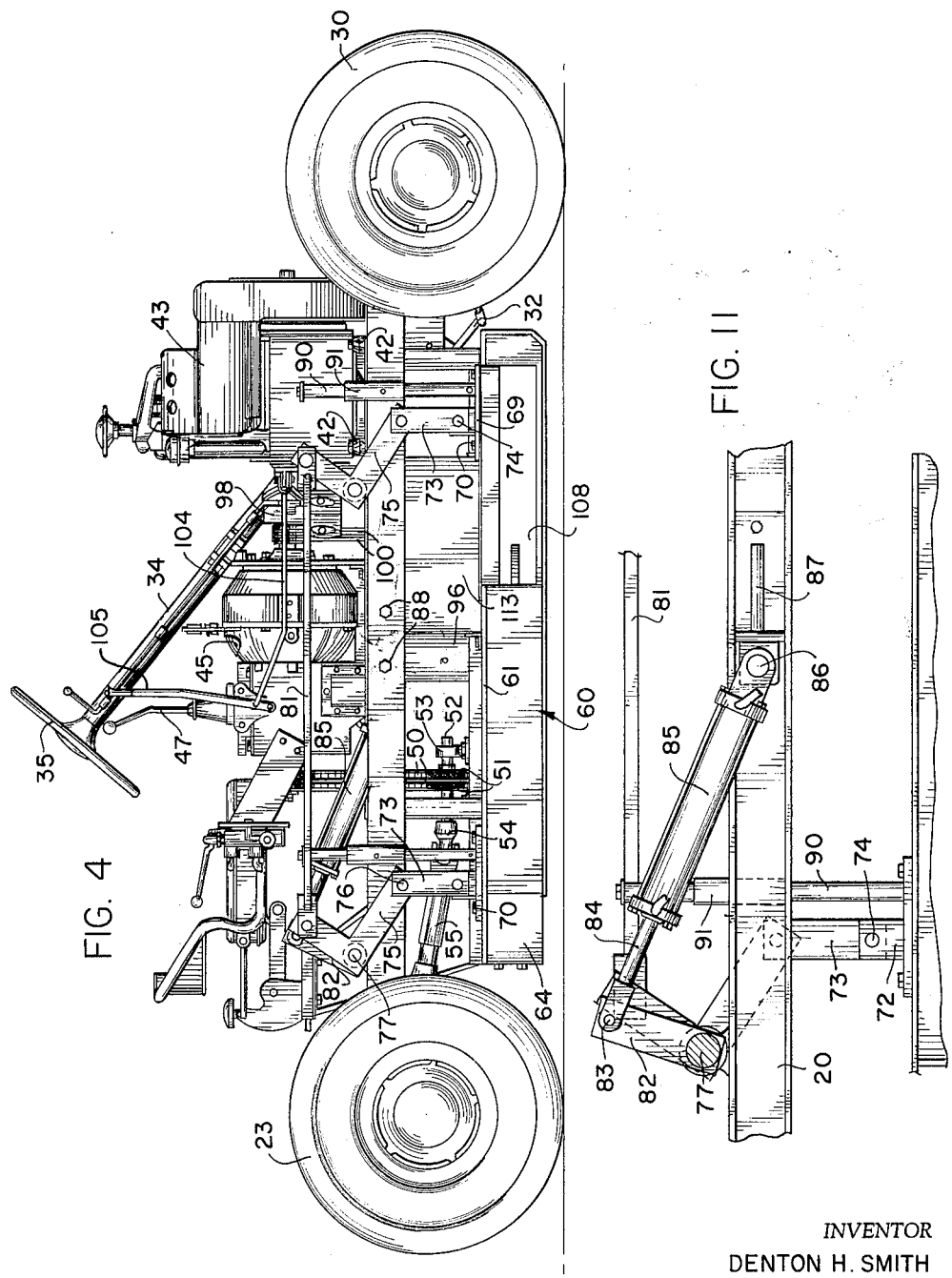
Figure 5:
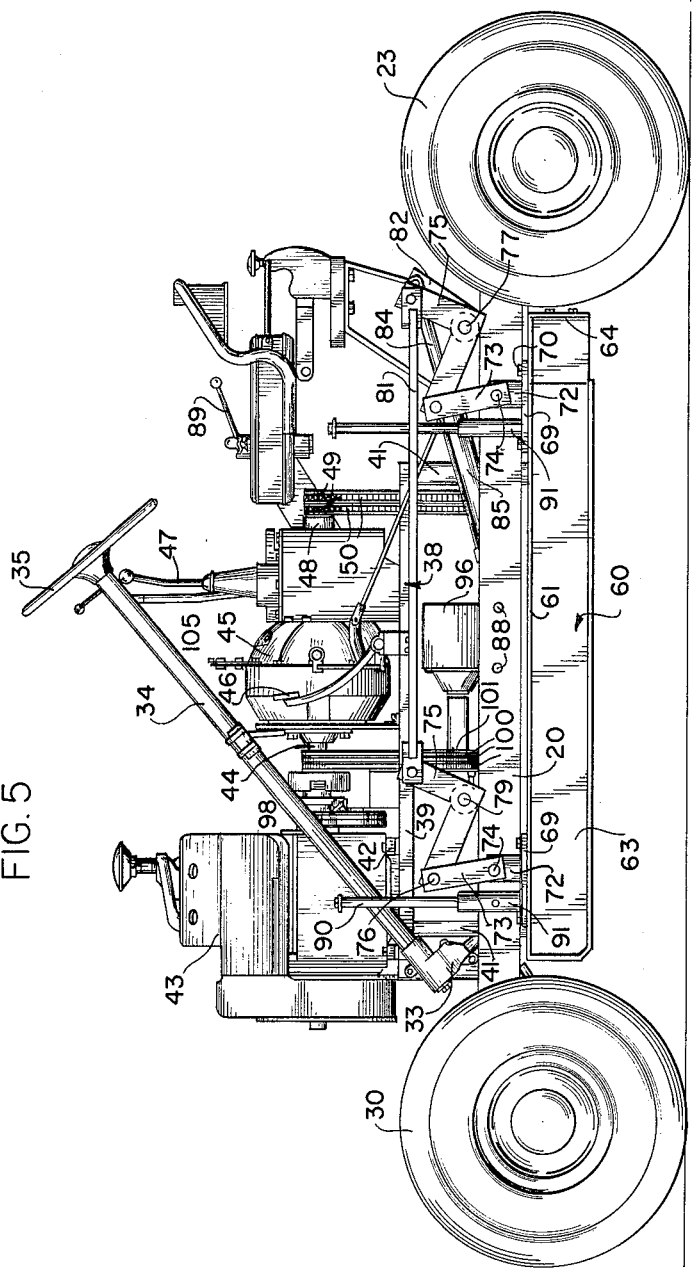
Figure 6:
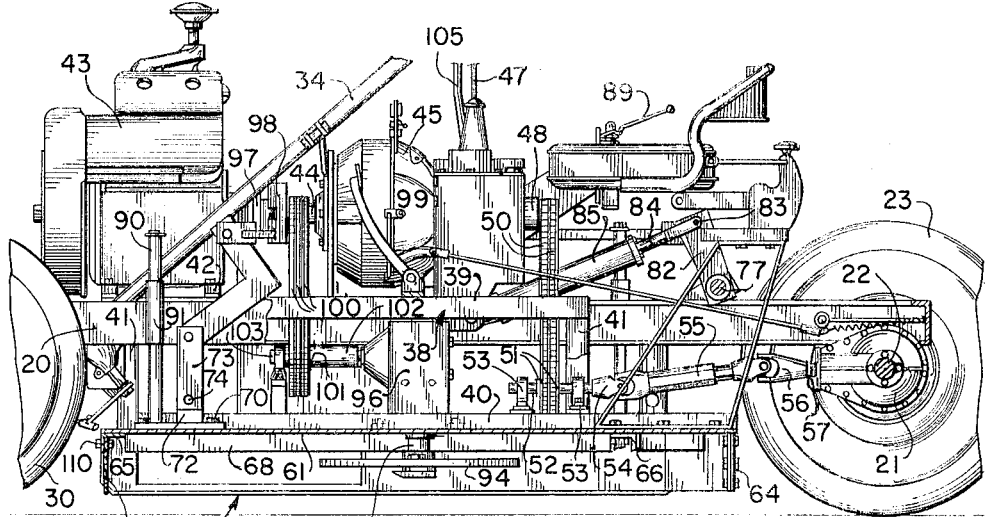
Figure 7:
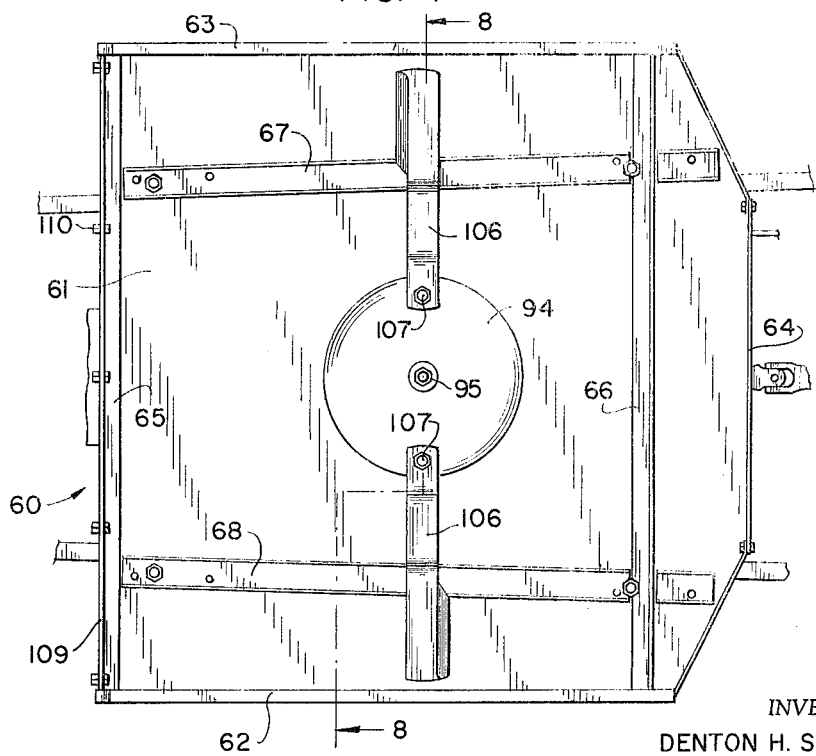

Other objects and advantages of the invention will be apparent from the following description taken in conjunction with the accompanying drawings wherein:

FIG. 1 is a front elevation of the vehicle of the present invention;

FIG. 2, a rear elevation of the vehicle of FIG. 1;

FIG. 3, a top plan view thereof;

FIG. 4, a side elevation taken from the right side;

FIG. 5, a side elevation taken from the left side;

FIG. 6, a section taken along the line 6—6 of FIG. 3;

FIG. 7, a bottom plan view of the cutter element;

FIG. 8, an enlarged fragmentary detail section taken along the line 8—8 of FIG. 7;

FIG. 9, a detail section taken along the line 9—9 of FIG. 8;

FIG. 10, a perspective of one of the cutter blades;

FIG. 11, an enlarged fragmentary detail section of the raising and lowering mechanism taken along the line 11—11 of FIG. 3;

FIG. 12, a fragmentary bottom elevation of a modified form of the invention;

FIG. 13, an enlarged detail section taken along the line 13—13 of FIG. 12;

FIG. 14, an enlarged vertical section taken along the line 14—14 of FIG. 13; and FIG. 15, a perspective of one of the snow removing arms.

Briefly stated the present invention is a self-propelled vehicle which is adaptable for cutting vegetation during the growing season and for removing snow during the colder season. The vehicle comprises a main frame and an auxiliary frame with such auxiliary frame adapted to support the heavier portions of the vehicle such as the motor, transmission, drive mechanism, cutter mechanism, and the operator, and such auxiliary frame is capable of being raised and lowered relative to the main frame to alter the center of gravity of the device so that the danger of the vehicle turning over is substantially reduced when traversing a relatively steep slope.

With continued reference to the drawings the vehicle of the present invention includes a generally rectangular main frame 20 having a differential 21 on the rear which drives a pair of rear axles 22 which in turn drive rear ground engaging wheels 23 carried by the frame 20. A downwardly extending bracket 24 is attached to the front portion of the frame 20 along the longitudinal axis thereof and a front axle 25 is pivotally mounted to such bracket by a pivot pin 26. A spindle assembly 27 is fixed to each end of the front axle and such spindle assemblies are retained within yokes 28 by pivot pins 29 with such yokes being carried by front wheels 30. The yokes 28 are connected by a tie rod assembly 31 to one end of which a link 32 is connected by a ball and socket joint. The opposite end of the link 32 is connected by a ball and socket joint to a steering lever 33 operated by a steering column 34 and a steering wheel 35 in a conventional manner.

An auxiliary frame 38 is disposed within the confines of the main frame 20 and includes an upper portion 39 of generally rectangular configuration and of angle iron construction and a lower portion 40 of similar construction connected to the upper portion by upright posts 41. The upper portion 39 is provided with blocks 42 on which a motor 43, preferably of the internal combustion type, is mounted. The motor 43 has a crank shaft 44 extending rearwardly into a standard transmission housing 45 including a conventional clutch and transmission controlled by a clutch pedal 46 and gear shift 47, respectively. A transmission shaft 48 extends rearwardly of the transmission housing 45 and a pair of sprockets 49 are keyed or otherwise fixed to such shaft and engage a pair of drive chains 50 which extend downwardly around a pair of driven sprockets 51 mounted on a shaft 52 journaled in a pair of pillow blocks 53 which are mounted on the lower portion 40 of the auxiliary frame 38. A universal connection 54 is fixed to one end of the shaft 52 and is adapted to drive an extendable and retractable drive shaft 55, the opposite end of which is connected by a universal connection 56 to a differential shaft 57 which in turn rotates the rear axles 22 and rear wheels 23 to propel the vehicle.

The auxiliary frame 38 is mounted on a housing 60 having an upper wall or plate 61, depending side flanges 62 and 63 and a depending rear flange 64. The plate 61 is strengthened by transverse structural members 65 and 66 attached to the lower portion of such plate in any desired manner and by longitudinal channel members 67 and 68 located in spaced generally parallel relation with each other and attached to the bottom of the plate 61 in any desired manner.

The housing 60 with the auxiliary frame 38 mounted thereon is suspended from the main frame 20 by means of a plurality of anchor plates 69 which are mounted on the upper surface of the plate 61 by means of bolts 70 or the like which extend downwardly through the channel members 67 and 68 and are secured thereto by nuts 71. An upstanding lug 72, is attached to each of the anchor plates 69 and a link 73, is rotatably connected at one end to each of the lugs 72 by means of a pivot pin 74. The opposite end of each of the links is pivotally connected to the free end of one arm of a bell crank 75 by a pivot pin 76.

The intermediate portion of the rearmost bell cranks are mounted on the ends of a cross-rod 77 which extends across the main frame 20 and is journaled in bearings 78 attached to the upper portion of the main frame 20. The forward bell cranks each have a stub shaft 79 projecting inwardly from the intermediate portion thereof and such shafts are journaled in bearings 80 mounted on the upper surface of the main frame 20. The free ends of the other arms of the bell cranks on each side of the main frame are connected by a tie rod 81 in such a manner that when one of the bell cranks is operated, all of the bell cranks will be operated in a like manner.

In order to operate the bell cranks, an arm 82 is fixed to the cross rod 77 adjacent to each end thereof and such arms have their free ends pivotally connected by pivot pins 83 to one end of a piston rod 84 operated by fluid cylinders 85. The opposite end of the fluid cylinder is pivotally mounted by a pin 86 to a bracket 87 attached to the main frame 20 by bolts 88 or the like. The fluid cylinders 85 are under the influence of a four-way control valve 89 mounted in a position adjacent to the operator of the vehicle so that the operator can control the vertical position of the auxiliary frame relative to the main frame. The housing 60 is provided with a plurality of posts 90 which preferably are pivotally mounted on the anchor plates 69 and such posts are slidably received within guides 91 which in turn are fixed on the main frame 20 so that when the auxiliary frame 38 is raised and lowered the posts 90 and guides 91 will permit the frame to move up and down in substantially the same vertical plane.

In order to cut vegetation a rotary disk 94 is mounted below the upper plate 61 of the housing 60 on a shaft 95 which projects upwardly through such plate into a gear box 96. The gear box 96 is adapted to be driven from the crank shaft of the motor 43 by means of a pair of clutch members 97 and 98 with the member 97 being keyed or otherwise attached to the crank shaft 44 and movable lengthwise thereof and the member 98 being freely rotatable on such crank shaft. The clutch member 98 has attached thereto a multiple sheeve pulley 99 which drives a plurality of belts 100 which extend downwardly around a second multiple sheeve pulley 101 fixed to a shaft 102 journaled at one end in a pillow block 103 and drivingly connected at its opposite end to gear box 96. The clutch member 97 is connected to an operating rod 104 having its opposite end pivotally connected to an operating handle 105 located in a position convenient to the operator of the vehicle so that the clutch members 97 and 98 may be moved selectively into and out of engagement to operate the rotary disk 94.

The disk 94 is provided with a pair of cutter blades 106 each of which is pivotally mounted on such disk by a single fastener 107 so that such blades will be maintained in an extended position relative to the disk by means of centrifugal force when such disk is rotating. The cutter blades 106 preferably are relatively thick and are constructed of tempered steel and the disk is preferably rotated at a speed of approximately 1100 r.p.m. so that due to the strength of the cutter blades and the speed of rotation such blades will not be damaged by coming into contact with rocks or other obstacles.

The flange 62 may have an opening 108 therein through which vegetation that has been cut will be discharged. If desired the front of the housing 60 may be substantially covered by flexible materials such as a web of belting 109 or the like, and such belting may be attached to the transverse structural member 65 by means of fasteners 110. The belting 109 is of sufficient flexibility to ride over any obstacle and is of sufficient strength to cushion the blow of any obstacle thrown out of the housing by the cutter blades 106.

The hydraulic system of the vehicle includes a sump or reservoir 113 connected in any desired manner to a fluid motor 114. In order to operate the fluid motor 114 a multiple sheeve pulley 115 is mounted on the fluid motor shaft 116 and is operated by a plurality of belts 117 which are driven by a multiple sheeve pulley 118 fixed to the crank shaft 44 of the motor 43 in such a manner that the fluid motor 114 will be operated upon the operation of the motor 43. The fluid motor 114 is connected by hydraulic lines not shown to the control valve 89 and to the fluid cylinders 85.

As illustrated in FIGS. 12–15 the cutter blades 106 may be replaced by arms 122 on the outer end of which is mounted a backing 123 having bristles 124 inset therein. The backing is removably attached by fasteners 125 to arms 122.

In the operation of the device the auxiliary frame 38 is normally raised to its uppermost position while traveling along a road or across country to permit the vehicle to pass over obstacles and to afford better visibility for the operator. After the vehicle has reached the site of the vegetation to be cut the control valve 89 is operated to activate the fluid cylinders 85 and lower the auxiliary frame 38 to a position such that the disk 94 and the cutter blades 106 are at any desired elevation. The lowering of the auxiliary frame substantially lowers the center of gravity of the vehicle so that the vehicle can traverse a relatively steep slope without danger of turning over. The main frame 20 is relatively wide so that the wheels 23 and 30 are spaced a substantial distance apart in order to provide a wider wheel base and further decrease the tendency to turn over. The disk 94 and the cutter blades 106 extend outwardly beyond the width of the wheels to cut a relatively wide swath through the vegetation.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A self-propelled vehicle for cutting vegetation comprising a generally rectangular main frame, ground-engaging front and rear wheels supporting said main frame, an auxiliary frame mounted for vertical movement on said main frame, a power plant and transmission mounted on said auxiliary frame, means for driving certain of said wheels from said power plant, an operator's station mounted on said auxiliary frame, steering means located at said operator's station and connected to certain other of said wheels for guiding the vehicle, a housing connected to said auxiliary frame, a horizontally disposed disk having a plurality of cutter blades rotatably mounted within said housing, a pair of bell cranks pivotally mounted on each side of said main frame, link means connecting said housing and each of said bell cranks, means connecting said bell cranks on each side of said frame, a cross rod extending across said main frame and connected to two of said bell cranks, a pair of spaced arms fixed to said cross rod, fluid motor means connected at one end to said arms and at the opposite end to said main frame, control means for selectively operating said fluid means, whereby said fluid means will rotate said cross rod and said bell cranks to raise and lower said auxiliary frame relative to said main frame.

2. The structure of claim 1 in which said cutter blades are removably mounted on said disk and are replaceable by brush means whereby the rotation of said disk will provide a sweeping action to remove snow.

3. A self-propelled vehicle for cutting vegetation above the surface of the earth comprising a relatively wide generally rectangular main frame, pairs of front and rear ground-engaging wheels located exteriorly of the sides of said frame for supporting the same, an auxiliary frame selectively adjustably supported by said main frame, a power plant and transmission mounted on said auxiliary frame, means drivingly connecting said power plant and transmission with said pair of rear wheels for propelling the vehicle, steering means carried by said auxiliary platform and connected to said pair of front wheels for guiding the vehicle, a cross rod rotatably mounted on said main frame adjacent to said rear wheels, a first lever fixed intermediate its ends to each end of said cross rod, a second lever pivotally mounted intermediate its ends on opposite sides of said main frame in spaced relation to said first levers, a tie rod connecting one end of each of said first and second levers on each side of said main frame, at least one arm fixed at one end to said cross rod, fluid motor means pivotally connected at one end to said main frame and at the opposite end to the other end of said arm for rotating said cross rod and said levers, a link pivotally connecting the opposite end of each lever to said auxiliary frame, a plurality of upwardly extending posts fixed to said auxiliary frame, a plurality of sleeves fixed to said main frame for slidably receiving said posts to maintain the alignment of said auxiliary frame relative to said main frame, a horizontally disposed rotatable disk located beneath said auxiliary frame, clutch means for selectively operating said disk from said power plant, and a plurality of cutter blades pivotally mounted on said disk, whereby the major portion of the weight of the vehicle including the operator is mounted on said auxiliary frame so that raising and lowering the auxiliary frame relative to said main frame will shift the center of gravity of said vehicle.

References Cited by the Examiner
UNITED STATES PATENTS

| | | | |
|---|---|---|---|
| 2,739,517 | 3/56 | Roberts. | |
| 2,777,270 | 1/57 | Colclazier | 56—25.4 |
| 2,928,223 | 3/60 | Danuser | 56—25.4 |
| 2,958,175 | 11/60 | Sprinkle | 56—25.4 |
| 2,987,865 | 6/61 | Sherman | 56—25.4 |

T. GRAHAM CRAVER, *Primary Examiner.*

CARL W. ROBINSON, ARNOLD RUEGG, *Examiners.*